US010422395B2

(12) United States Patent
Klumpner (10) Patent No.: US 10,422,395 B2
(45) Date of Patent: Sep. 24, 2019

(54) ACTUATING DEVICE FOR AN INTERNAL EXPANDING BRAKE WITH A MANUALLY ACTUABLE RESTORING DEVICE (71) Applicant: KNOTT GMBH, Eggstätt (DE)

(72) Inventor: Andreas Klumpner, St. Georgen (DE)

(73) Assignee: KNOTT GMBH, Eggstätt (DE)

( * ) Notice: Subject to any disclaimer, the term of this patent is extended or adjusted under 35 U.S.C. 154(b) by 47 days.

(21) Appl. No.: 15/527,535

(22) PCT Filed: Nov. 10, 2015

(86) PCT No.: PCT/EP2015/002256
§ 371 (c)(1),
(2) Date: May 17, 2017

(87) PCT Pub. No.: WO2016/078752
PCT Pub. Date: May 26, 2016

(65) Prior Publication Data
US 2017/0321774 A1 Nov. 9, 2017

(30) Foreign Application Priority Data
Nov. 20, 2014 (DE) .................. 10 2014 017 156

(51) Int. Cl.
F16D 65/56 (2006.01)
F16D 55/00 (2006.01)
F16D 125/66 (2012.01)

(52) U.S. Cl.
CPC .... F16D 65/562 (2013.01); F16D 2055/0029 (2013.01); F16D 2125/66 (2013.01)

(58) Field of Classification Search
CPC ............... F16D 65/562; F16D 2125/66; F16D 2055/0029; F16D 65/22
(Continued)

(56) References Cited

U.S. PATENT DOCUMENTS 4,705,147 A 11/1987 Pressaco et al.
4,815,571 A 3/1989 Margetts et al.

FOREIGN PATENT DOCUMENTS

DE 73 45 549 3/1974
DE 196 32 917 2/1997
(Continued)

OTHER PUBLICATIONS

German Office Action issued in Appln No. 10 2014 017 156.6 dated Aug. 21, 2015 (w/ translation).
(Continued)

Primary Examiner — Xuan Lan Nguyen
(74) Attorney, Agent, or Firm — Nixon & Vanderhye P.C.

(57) ABSTRACT

An actuating device for an internal expanding brake has a restoring device for manual adjusting and restoring of an adjusting pin relative to an expanding piston. The restoring device includes an actuating pin which is mounted rotatably in a housing and is configured for transmitting a torque which is applied manually to the actuating pin, and a restoring gear mechanism which has a first gearwheel which is coupled to the actuating pin and a second gearwheel which is coupled to an adjusting nut. The first gearwheel of the restoring gear mechanism which is coupled to the actuating pin can be displaced in the axial direction of the actuating pin and can be brought into and out of torque-proof engagement with the actuating pin by means of a coupling device in a manner which is dependent on the transmitted torque.

14 Claims, 5 Drawing Sheets (58) Field of Classification Search
USPC .................................. 188/343, 196 R, 79.56
See application file for complete search history.

(56) References Cited

FOREIGN PATENT DOCUMENTS

DE  20 2014 101 288    5/2014
GB         1 419 254   12/1975

OTHER PUBLICATIONS

International Search Report for PCT/EP2015/002256, dated Mar. 18, 2016, 4 pages.
International Preliminary Report on Patentability issued in PCT/EP2015/002256 dated May 23, 2017.

ACTUATING DEVICE FOR AN INTERNAL EXPANDING BRAKE WITH A MANUALLY ACTUABLE RESTORING DEVICE

This application is the U.S. national phase of International Application No. PCT/EP2015/002256 filed 10 Nov. 2015, which designated the U.S. and claims priority to DE Patent Application No. 10 2014 017 156.6 filed 20 Nov. 2014, the entire contents of each of which are hereby incorporated by reference.

The invention relates to an actuating device for an internal expanding brake in accordance with the preamble of claim 1.

An actuating device of this type which is used, for example, in a wedge-actuated brake, is known from U.S. Pat. No. 4,705,147. The actuating device therein has, on each side, an adjusting nut rotatably mounted in an expansion piston, into the self-locking internal thread of which an adjusting pin is screwed. The externally placed end of the adjusting pin is non-rotatably connected to a brake shoe web. In order to compensate for the wear on the respective friction linings, an automatic adjusting device is provided for automatic adjustment of the adjusting pin depending upon the clearance between the brake shoes and the brake drum, wherein with increasing lining wear, the adjusting pin is increasingly screwed out of the adjusting nut and the expansion piston and the clearance is thereby kept constant.

Automatic adjusting devices of this type therefore have the consequence that with worn brake linings, the adjusting pins protrude so far laterally outwards beyond the adjusting nuts or the expansion pistons that an exchange of the brake linings is only possible if the adjusting pins are moved back again into the adjusting nuts and the expansion pistons. For this purpose, U.S. Pat. No. 4,705,147 comprises a restoring device for manual restoration of the adjusting pin relative to the expansion piston, wherein the restoring device has an actuating pin which is rotatable and axially displaceable in the housing and is configured for transmitting a torque applied manually to the actuating pin, and a restoring gear mechanism which has a first bevel gear arranged on the internal end of the actuating pin and a second gearwheel which is non-rotationally coupled to the adjusting nut. By pressing the actuating pin into the housing, the bevel gear of the actuating pin comes into engagement with the second gearwheel so that by means of manual rotation of the actuating pin, the adjusting nut can be rotated such that the adjusting pin is moved into the adjusting nut.

A disadvantage of this known actuating device is that a two-part housing is necessary to be able to mount the second gearwheel. Furthermore, in order to rotate the actuating pin, an increased force must be applied, since the rotation of the second gearwheel can only take place against the resistance of a friction ring cooperating with the second gearwheel. Furthermore, this known restoring device offers no overload protection that is effective when the adjusting pin, on restoration, has reached its inner end stop or, on manual retraction of the adjusting pin, the brake shoes lie against the brake drum. An overloading of the restoring device therefore cannot be reliably prevented. A further disadvantage is that the restoring device therein is restricted to the function of the manual restoration of the adjusting pin and does not offer any additional functions. In particular, no conclusions can be drawn regarding the functioning of the automatic adjusting device. For the securing of the actuating pin within a housing bore, an additional securing pin is required which must be inserted into the housing transversely to the actuating pin and engages in an elongate groove of the actuating pin.

It is an object of the invention to provide an actuating device for an internal expanding brake of the type mentioned at the outset with a restoring device which can be manufactured and mounted in the simplest and most economical manner possible and also offers additional functions, in particular an overload protection.

This object is achieved according to the invention with an actuating device having the features of claim 1. Advantageous embodiments of the invention are described in the further claims.

The actuating device according to the invention comprises a restoring device for manual setting and restoration of the adjusting pin relative to the expansion piston, the restoring device having an actuating pin which is rotatably mounted in the housing and is configured for transmitting a torque applied manually to the actuating pin, and a restoring gear mechanism which has a first gearwheel coupled to the actuating pin and a second gearwheel coupled to the adjusting nut, in order to transmit the rotary movement of the actuating pin to the adjusting nut. According to the invention, the first gearwheel of the restoring gear mechanism, said gearwheel being coupled to the actuating pin, is displaceable in the axial direction of the actuating pin and is bringable by means of a coupling device, depending upon the torque transmitted, into and out of non-rotational engagement with the actuating pin.

The coupling device according to the invention offers the advantage that an overload protection which prevents the force flow between the actuating pin and the adjusting nut when the counterforce generated by the adjusting nut exceeds a specified value is provided by simple means. This is the case, for example when, on restoration of the adjusting pin, the adjusting pin reaches an inner end stop. An overloading of the restoring device can thereby be reliably prevented. All the parts of the restoring device can be manufactured and mounted easily and economically. A two-part housing is not required. For restoration, only minimum frictional forces must be overcome, so that the restoration can be carried out with little force application. In addition, the restoring device can be implemented with a very small number of parts. The setting and restoring of the actuating device is possible with the internal expanding brake fully mounted.

According to an advantageous embodiment of the invention, the second gearwheel consists of a spur gear and the first gearwheel consists of a crown gear which is bringable into and out of mesh with the second gearwheel. The rotation axes of the first and second gearwheel are arranged at right angles to one another, the rotation axis of the second gearwheel expediently being aligned with the rotation axis of the adjusting nut, whilst the rotation axis of the first gearwheel expediently aligns with the rotation axis of the actuating pin. By this means, only forces in the peripheral direction are applied to the second gearwheel which is coupled to the adjusting nut, whereas forces transverse to the main plane of the second gearwheel are avoided. By this means, a very favourable force flow is achieved, whereas a distortion of the adjusting nut can be avoided.

Alternatively thereto, it is also possible that the first and second gearwheels are configured differently, for example, as bevel gears.

Advantageously, the first gearwheel is mounted axially displaceably on the actuating pin, wherein the actuating pin penetrates the first gearwheel centrally. By this means, a very simple design can be implemented with a minimum number of components.

Advantageously, the coupling device comprises a first coupling part fixedly arranged on the actuating pin and radially protruding, as well as a second coupling part fixedly arranged on the first gearwheel, which is bringable into and out of driving engagement with the first coupling part, depending upon the transmitted torque. It is particularly advantageous in this case if the first coupling part comprises a drive gear tooth system fixedly arranged on the actuating pin and the second coupling part comprises a driven gear tooth system which is fixedly arranged on the first gearwheel and is bringable into and out of driving engagement with the drive gear tooth system. Alternatively to such tooth systems, however, it is also possible to provide other cooperating coupling elements between the actuating pin and a first gearwheel, for example, one or more cylindrical driver elements which can be provided on the actuating pin or on the first gearwheel and can positively engage in correspondingly formed trough-shaped depressions which are provided in the respective other coupling part.

A particularly reliable functioning and simultaneous force-transmission is achieved if the drive gear tooth system and the driven gear tooth system each consist of a spur gear tooth system.

According to an advantageous embodiment, the drive gear and driven gear tooth systems have teeth with wedge-shaped tooth flanks extending in an inclined manner such that the torque transmitted by means of the actuating pin generates an axial force between the first and second coupling parts which urges the first and second coupling parts apart axially. Thereby, an overload protection can be simply provided, since above a maximum permissible torque, the drive gear and driven gear tooth systems are automatically pushed apart by the force components generated in the axial direction of the actuating pin, so that they can be mutually separated in the manner of a slip clutch.

According to an advantageous embodiment, the teeth of the actuating pin and/or of the first gearwheel have a stepped tooth flank which has two inclined portions for transmitting a torque and comprises a flat portion arranged between the inclined portions, which flat portion is configured as an axial support portion for the opposing coupling part. Thereby, a "double coupling" is provided, i.e. a coupling with which the coupling device can transmit torques in two different coupling positions between the actuating pin and the first gearwheel, wherein in the first coupling position, the two coupling parts engage fully in one another and have a minimum axial spacing from one another, whereas in the second coupling position, the coupling parts are separated by a predetermined amount from one another and therefore have a greater axial spacing from one another. It is thereby possible to reduce the penetration depth of the tooth system of the first gearwheel in the tooth system of the second gearwheel and to hold it in a position which is favourable for a functional test of the automatic adjusting device.

Advantageously, the actuating pin is mounted longitudinally displaceably in a bore of the housing and is movable between an outer position and an inserted position, wherein the first gearwheel is out of engagement with the second gearwheel when the actuating pin is in its outer position and the coupling parts of the actuating pin and of the first gearwheel maximally engage with one another, and wherein the first gearwheel is in engagement with the second gearwheel when the actuating pin is in its inner position.

Advantageously, the first gearwheel is pressed against the coupling part of the actuating pin by a spring surrounding the actuating pin and supported against the housing, by which means the actuating pin is biased into its outer position. The biasing of the actuating pin in its axial direction outwards thus takes place indirectly by means of the spring via the first gearwheel.

It is particularly advantageous in this case if the first gearwheel is situated in a housing cavity which is delimited towards the expansion piston at least in part by means of a housing portion surrounding the expansion piston, against which housing portion the spring is supported. Such a housing cavity can be achieved by relatively easy means with a suitable mould and machining of the housing with a simple contour bore. Dividing the housing is not necessary for this.

Advantageously, the actuating pin is mounted in a bearing bushing fixed in the bore of the housing, said bushing forming an axial stop for delimiting the axial outward movement of the actuating pin. An additional element which serves as an axial stop is therefore not necessary.

Advantageously, the actuating pin comprises a stop surface formed by a diameter step which cooperates with the bearing bushing to delimit the outward axial movement of the actuating pin, wherein the diameter step is formed by the rear side of the first coupling part. The coupling part of the actuating pin thus assumes the function of an axial stop means so that no additional element is necessary for this. Alternatively for this purpose, it is also possible to form the stop means arranged on the actuating pin by means of a component separate from the coupling part or a separate portion of the actuating pin.

A simple embodiment results when the second gearwheel is rigidly connected to the adjusting nut and protrudes radially over the adjusting nut and the expansion piston.

The invention will now be described in greater detail by reference to examples in the drawings. In the drawings.

Figure 1:
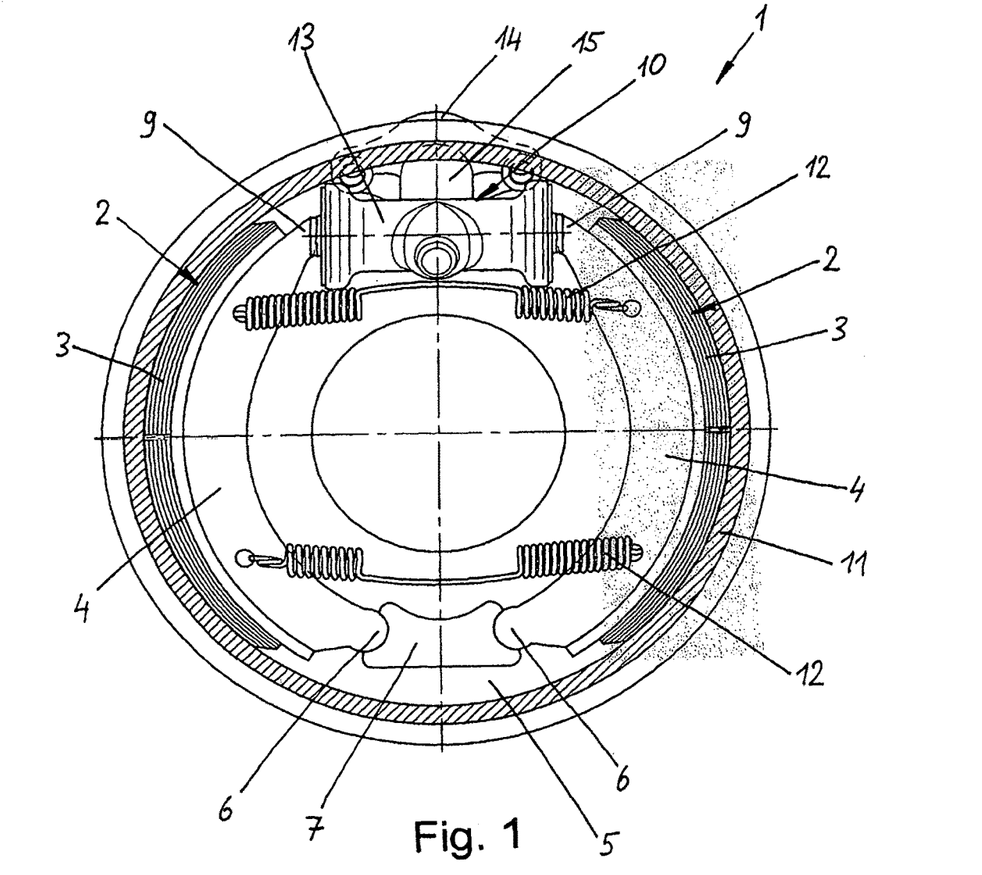
FIG. 1 is a side view of an internal expanding brake with an actuating device according to the invention, wherein for greater clarity, individual parts are shown simplified or are omitted.

FIG. 1 shows essential parts of an internal expanding brake 1 in the form of a simplex wedge-actuated brake. This can be, in particular, a compressed air-actuated vehicle brake. However, the invention is not restricted to brakes of this type, but can also be used for other types of internal expanding brakes, for example, duplex or servo brakes.

Two brake shoes 2 of the internal expanding brake 1 each have in the normal manner a friction lining 3 and one or two brake shoe webs 4. The brake shoe webs 4 are pivotably supported at their lower end 6 on a support bearing 7 which is fastened to a backing plate 5. The upper ends 9 of the brake shoe webs 4, however, are supported on an actuating device 10 which, in the exemplary embodiment shown, is configured as a wedge-actuated device, and can be pushed laterally outwards by it in order to press the friction linings 3 against the peripheral wall of a brake drum 11 and thereby to carry out a braking procedure. For the withdrawal of the brake shoes 2 into their non-braking starting position, two shoe withdrawal springs 12 are provided, which are hooked into the mutually opposed brake shoe webs 4 and pull the brake shoes 2 together.

The actuating device 10 comprises a housing 13 which is rigidly connected to the backing plate 5. The housing 13 has a T-shaped portion which extends from the backing plate 5 into the space enclosed by the brake drum 11, and also an outer flange portion 14 which is arranged on the opposite side of the backing plate 5 and serves for fastening a brake cylinder (not shown).

Figure 2:
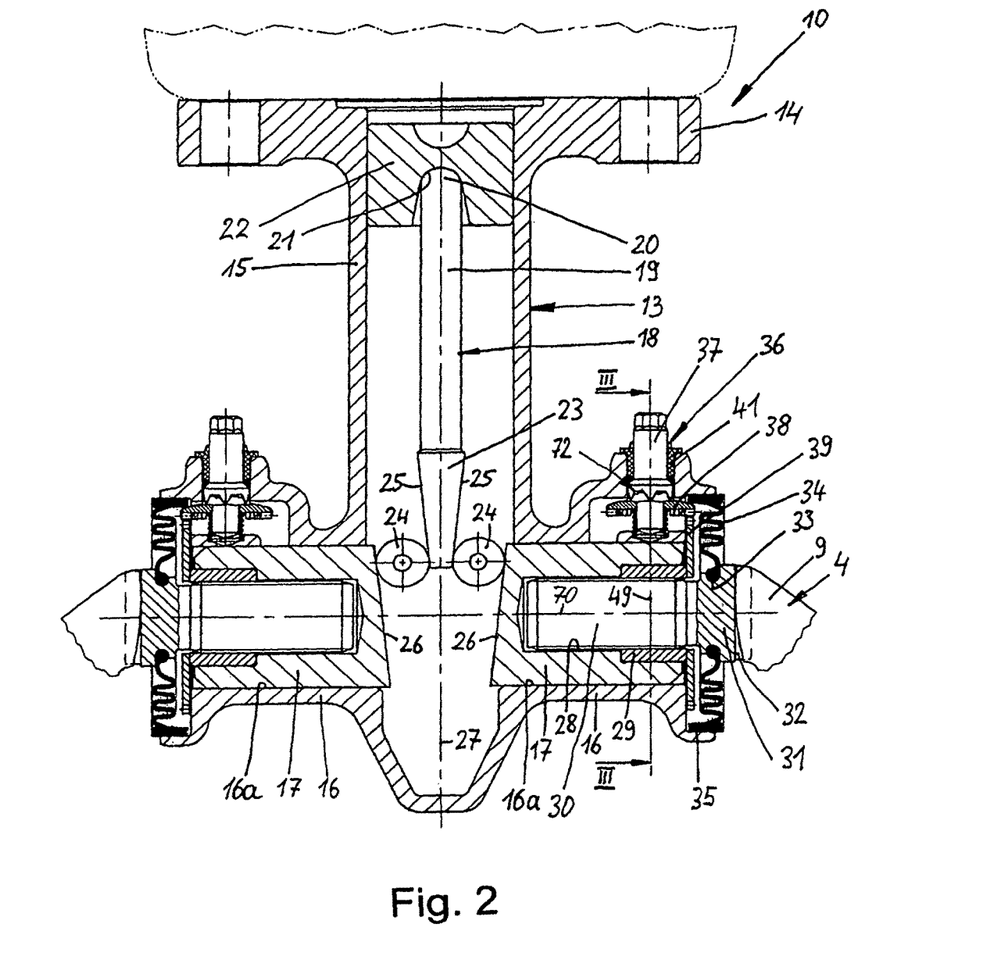
FIG. 2 is a section through the actuating device of FIG. 1.

As FIG. 2 shows, the housing 13 comprises a central, hollow cylindrical guide portion 15, the outer edge of which the flange portion 14 adjoins, whereas from its opposite end situated within the brake, two cylindrical portions 16 extend in opposing directions and laterally outwards perpendicularly to the guide portion 15. The cylinder portions 16 each have a cylinder bore 16a in which a non-rotational expansion piston 17 is mounted axially displaceably.

The displacement of the expansion piston 17 takes place by means of a pressing wedge 18 which is arranged longitudinally displaceably in the guide portion 15. The pressing wedge 18 comprises a shaft 19 with a hemispherically shaped end 20 which is mounted in an articulated manner in a dome-shaped depression 21 of a piston 22. The piston 22 is displaceably mounted within the guide portion 15 of the housing 13 and is moved by the brake cylinder (not shown).

At the opposite end, the pressing wedge 18 has a wedge portion 23. The wedge portion 23 engages between two rollers 24 which are positioned within the housing 13 by a cage (not shown) such that they can move between the two expansion pistons 17 in the displacement direction of the pressing wedge 18.

The rollers 24 each lie, on one side, against an inclined surface 25 of the wedge portion 23 and, on the other side, against an inclined surface 26 of the expansion pistons 17. Since the inclination of the inclined surfaces 25 corresponds to the inclination of the opposing inclined surfaces 26, the rollers 24 can roll between parallel inclined surfaces. When the pressing wedge 18 is advanced, i.e. moved downwards in FIG. 2, the expansion pistons 17 are spread by means of the rollers 24, i.e. moved in opposite directions laterally outwards.

The housing 13 and the elements accommodated therein are symmetrical about a central plane 27 of the actuating device 10. In the following, therefore, only the side of the actuating device shown in FIG. 2 which is to the right of the midline 27 in FIG. 2 will be described. The left side is configured in the same way.

The expansion piston 17 is configured beaker-shaped and has a stepped cylindrical cavity 28 extending in the axial direction. This cavity 28 is open towards the laterally outwardly situated end side of the expansion piston 17. The outer form of the expansion piston 17 is also substantially cylindrical. The peripheral wall of the expansion piston 17 or parts of this peripheral wall serve as bearing surfaces with which the expansion piston 17 is mounted in the cylinder bore 16a.

As shown in FIG. 2, an adjusting nut 29 is mounted rotatably but axially non-displaceably within the cylindrical cavity 28 of the expansion piston 17 in the region of an outer end portion of the expansion piston 17. The adjusting nut 29 has a cylindrical outer peripheral surface. In addition, the adjusting nut 29 is arranged in a laterally outer end portion of the expansion piston 17 such that it extends as far as the outer end side of the expansion piston 17 or slightly beyond it.

The adjusting nut 29 is provided with a self-locking internal thread into which an adjusting pin 30 is screwed. For this purpose, the adjusting pin 30 has a corresponding external thread. The threaded portion of the adjusting pin 30 extends inwards beyond the adjusting nut 29 into the cavity 28 of the expansion piston 17.

A head portion 31 of the adjusting pin 30 protruding laterally outwards beyond the expansion piston 17 abuts the upper end 9 of the brake shoe web 4 with its end side. If the expansion pistons 17 are pressed laterally outwards by means of the pressing wedge 18, the opposing brake shoes 2 are thus spread and pressed against the brake drum 11.

The clearance which the friction linings 3 of the brake shoes 2 have from the brake drum 11 with the brake not actuated is determined by the position of the adjusting pin 30 relative to the expansion piston 17. By rotating the adjusting nut 29, the adjusting pin 30 which is arranged via the brake shoe web 4 non-rotationally within the actuating device 10, can be moved spindle-like out of or into the expansion piston 17. For non-rotational connection of the adjusting pin 30 to the brake shoe web 4, the adjusting pin 30 has on its outer end a groove 32 into which the upper end 9 of the brake shoe web 4 protrudes such that the opposing side surfaces of the groove 32 prevent a rotation of the adjusting pin 30. The play between the groove side surfaces and the brake shoe web 4 allows a relative movement of the brake shoe web 4 that is necessary for the pivoting of the brake shoes 2.

The rotation of the adjusting nut 29 takes place automatically on actuation of the brake depending on the actually existing clearance, for example, with the aid of an adjusting lever (not shown) and a ratchet wheel (also not shown) which cooperates with the adjusting nut 29, as described, for example, in the German patent application 10 2014 013 868, although this can take place in another manner.

Situated at the head portion 31 of the adjusting pin 30 is a peripheral groove 33 into which a resilient and temperature-resistant bellows 34 is inserted. The bellows 34 extends radially outwards to a cylindrical region 35 of the housing 13 which is situated in almost the same axial position as the groove 33. Over the cylindrical region 35, the housing 13 is sealed against the surroundings by the bellows 34.

In order to be able to move the adjusting pin 30 advanced laterally outwards by the automatic adjusting device with increasing lining wear manually back into the returned position shown in FIG. 2, for each adjusting pin 30, a restoring device 36 is provided which can be actuated manually. This restoring device 36 comprises an actuating pin 37 which can also be referred to as a restoring shaft, and a restoring gear mechanism which comprises a first gearwheel 38 coupled to the actuating pin 37 and a second gearwheel 39 coupled to the adjusting nut 29, in order to transmit a rotary movement of the actuating pin 37 to the adjusting nut 29.

Figure 3:
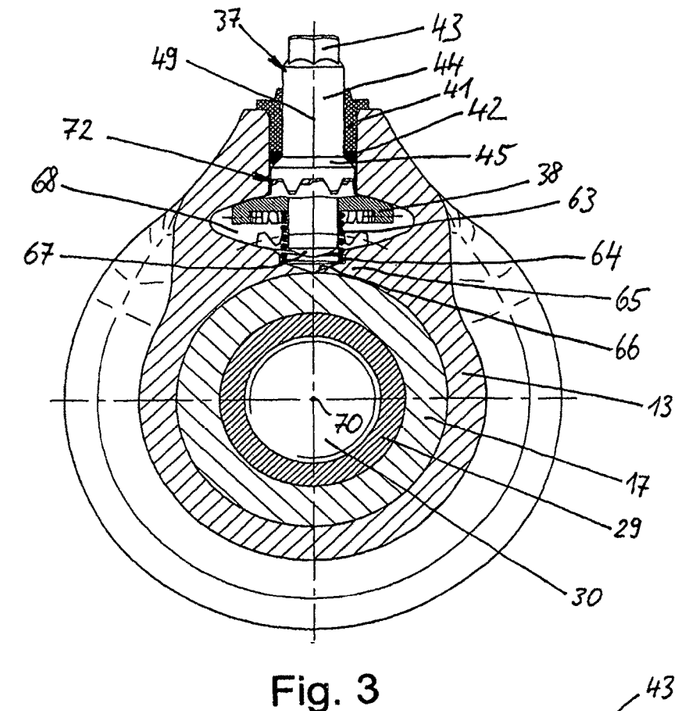
FIG. 3 is a section along the line III-Ill in FIG. 2.
Figure 4:
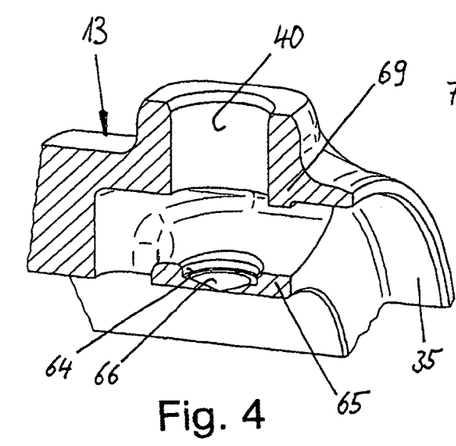
FIG. 4 is a section through the housing in the region of the bore accommodating the actuating pin.

The actuating pin 37 extends through a housing bore 40 which is arranged parallel to the central plane 27 of the guide region 15 of the housing 13. A bearing bushing 41 is pressed into this housing bore 40 as far as its collar. The bearing bushing 41 consists of a resilient and temperature-resistant material. Its outer end region is configured as a primary sealing site in the form of a sealing edge which lies tightly against the actuating pin 37. As shown by FIG. 3, the inner end side of the bearing bushing 41 arranged within the housing bore 40 forms a support surface for a secondary seal which is configured as a sealing ring 42 in the form of an O-ring.

The actuating pin 37 has an outer end region 43 lying outside the housing 13 with a profile which is configured for placement of a tool, for example a spanner, and for introducing a suitable torque. In the embodiment, the outer end region 43 has the form of an external hexagon. Adjoining the outer end region 43 is a cylindrical portion 44, at which the actuating pin 37 is radially mounted in the bearing bushing 41, and which is in contact with the primary seal. An adjoining conical surface 45 forms a second support surface for the secondary sealing site, i.e. for the sealing ring 42. The third support surface for the sealing ring 42 is formed by the inner wall of the housing bore 40. The region between the outer sealing lip of the bearing bushing 41 and the secondary sealing site therefore forms the sealing region for sealing the restoring device 36 outwardly and in relation to the housing 13.

Figure 5:
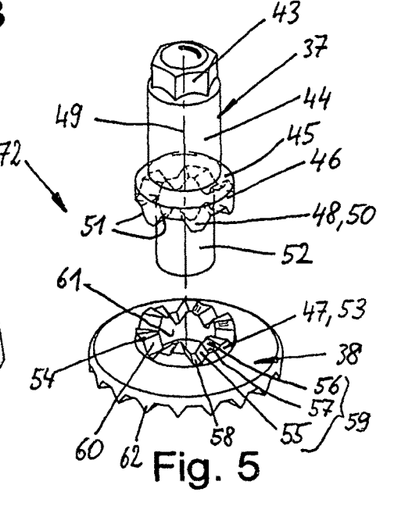
FIG. 5 is an exploded perspective view of the actuating pin and the first gearwheel.

As shown in particular by FIG. 5, provided between the actuating pin 37 and the first gearwheel 38 is a coupling device 72 which comprises a first coupling part 46 fixedly arranged on the actuating pin 37 and a second coupling part 47 fixedly arranged on the first gearwheel 38. This coupling device 72 serves to bring the first gearwheel 38 into and out of non-rotational engagement with the actuating pin 37, depending upon the torque transmitted. The first coupling part 46 is expediently configured integrally with the actuating pin 37. The second coupling part 47 is expediently configured integrally with the first gearwheel 38.

The first coupling part 46 comprises in the embodiment shown an end-side drive gear tooth system 48 in the form of crown gearing, for example Hirth serrations. The drive gear tooth system 48 is arranged concentrically with the longitudinal axis 49 of the actuating pin 37. The drive gear tooth system 48 protrudes radially beyond the adjoining portions of the actuating pin 37 and has teeth 50 which are arranged regularly along the periphery of the actuating pin 37 and are formed identically. In the embodiment shown, six teeth 50 are provided. The number of teeth 50 can vary over a large range and can be, for example, between one and fifteen teeth. The tooth flanks 51 of the teeth 50 extend towards their free end inclined to one another so that the teeth 50 have a wedge-shaped contour. Expediently, the tooth flanks 51 are configured symmetrically to one another. The angle that the two opposing tooth flanks 51 enclose between them is preferably between 30° and 120°, particularly expediently between 45° and 105°.

Adjoining the first coupling part 46 is a cylindrical portion 52 of the actuating pin 37, the outer diameter of which is less than the outer diameter of the first coupling part 46.

The second coupling part 47 of the first gearwheel 38 comprises an end-side driven gear tooth system 53 with teeth 54. The driven gear tooth system 53 is accordingly adapted to the drive gear tooth system 48 so that the two tooth systems 48, 53 can mesh with one another when the two coupling parts 46, 47 lie suitably close to one another.

The teeth 54 of the driven gear tooth system 53 are configured largely identically to the teeth 50 of the drive gear tooth system 48, with the difference that one of the tooth flanks of each tooth 54 is configured in a stepped manner and comprises a first inclined portion 55, a second inclined portion 56 and a flat portion 57 lying therebetween. The flat portion 57 lies at a higher level than the base surface 58 of the driven gear tooth system 53. The two inclined portions 55, 56 together with the flat portion 57 form a stepped tooth flank 59. The tooth flank 60 lying opposite the stepped tooth flank 59 can however be configured to be inclined steplessly and in the same way as the tooth flanks 51 of the drive gear tooth system 48.

If the teeth 50 of the drive gear tooth system 48 lie on the first inclined surfaces 55 of the driven gear tooth system 53, the first gearwheel 38 is in a first coupling position relative to the actuating pin 37. If, however, the teeth 50 of the drive gear tooth system 48 lie on the second inclined portions 56 and on the flat portions 57, the first gearwheel 38 is in a second coupling position in which the first gearwheel 38 is somewhat further removed from the first coupling part 46 of the actuating pin 37. This second coupling position serves, as described below, to hold the first gearwheel 38 slightly in meshing engagement with the second gearwheel 39 in order to be able to carry out a functional check of the automatic adjusting device.

As shown in FIG. 5, the first gearwheel 38 has a central axial bore 61 through which the cylindrical portion 52 of the actuating pin 37 is fed. The first gearwheel 38 is thus radially mounted on the cylindrical portion 52 and is displaceable along this portion 52, i.e. in the axial direction of the actuating pin 37.

On its side opposing the driven gear tooth system 53, the first gearwheel 38 has a tooth system 62 typical of crown gears.

As shown in FIGS. 2 and 3, the cylindrical portion 52 of the actuating pin 37 extends inwards beyond the first gearwheel 38 and forms a post, i.e. a guide for a spring 63 which is configured as a compression spring and surrounds the cylindrical portion 52 helically. The inside end of the spring 63 is supported in a depression 64 which is introduced into a housing portion 65 which surrounds the expansion piston 17. The depression 64 is delimited by a conical surface 66 against which a spherical inner end 67 of the actuating pin 37 can rest when the actuating pin 37 is pressed against the force of the spring 63 into the housing 13.

The outer end of the spring 63 is supported against the first gearwheel 38 so that the gearwheel is pressed outwards in the axial direction of the actuating pin 37. If no axial force is applied from outside to the actuating pin 37 and if the drive gear tooth system 48 and the driven gear tooth system 53 are in maximum engagement, i.e. in the first coupling position as shown in FIG. 3, the spring 63 presses the first gearwheel 38 and, by means of the coupling device 72, also the actuating pin 37 so far outwards that the conical surface 45 of the actuating pin 37 abuts the sealing ring 42 and is held by means of the bearing bushing 41 in the outer end position. In this outer end position, the first gearwheel 38 is in the upper region of a housing cavity 68 which is delimited inwardly by the housing portion 65 and upwardly by a wall 69 of the housing 13 in which the housing bore 40 is also situated.

From the outer position as shown in FIG. 3, the actuating pin 37 can be manually pressed inwards together with the first toothed gearwheel 38 by a predetermined amount if an external axial force is applied to the actuating pin 37. The first gearwheel 38 in this case moves downwards in FIG. 3, i.e. in the direction of a central axis 70 of the expansion piston 17 and the parts arranged within the expansion piston 17.

Figure 6:
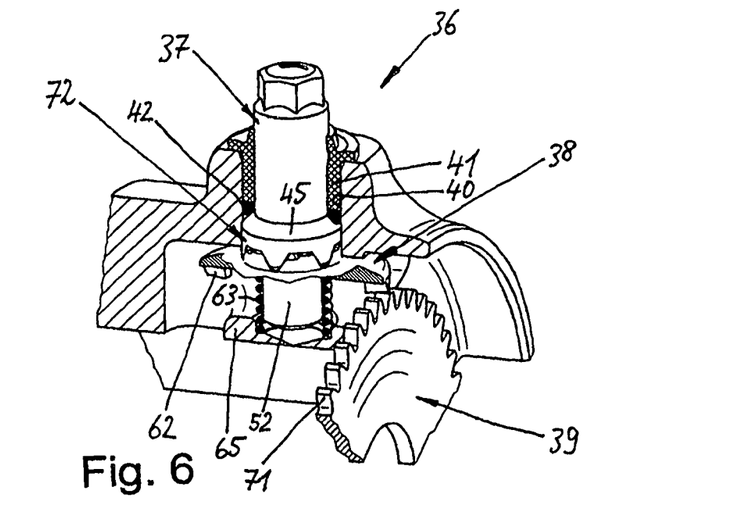
FIGS. 6 to 9 show essential parts of the restoring device in four different positions of the actuating pin and/or the coupling device.
Figure 7:
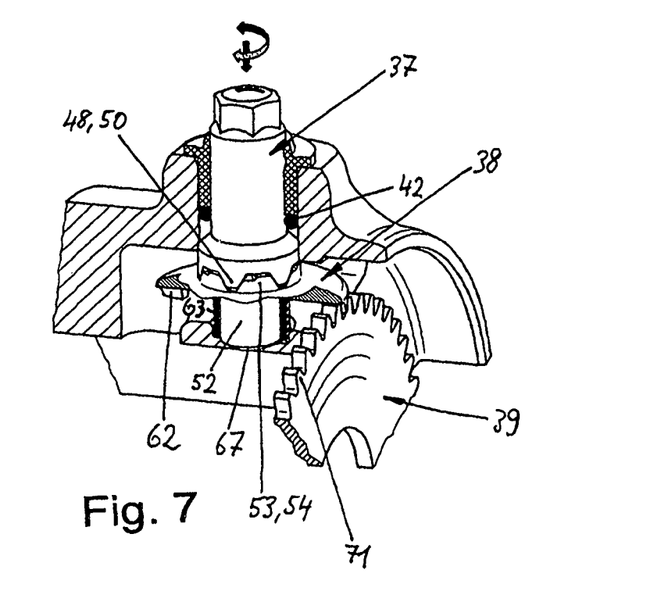

The second gearwheel 39 is rigidly connected to the outer end side of the adjusting nut 29 or is formed integrally with the adjusting nut 29. As FIG. 6 shows, the second gearwheel 39 is configured as a spur gear and has a tooth system 71 on its outer periphery. The axis of the second gearwheel 39 extends—as shown in FIG. 2—perpendicularly to the longitudinal axis 49 of the actuating pin 37 and thus perpendicularly to the axis of the first gearwheel 38. Furthermore, the second gearwheel 39 protrudes radially outwards so far beyond the housing portion 65 that its tooth system 71 meshes with the tooth system 62 of the first gearwheel 38 when the first gearwheel 38 is in its inwardly pressed position (FIG. 7). However, if the first gearwheel 38 is in its outer position, as shown in FIGS. 3 and 6, the first gearwheel 38 sweeps over the second gearwheel 39 without the tooth system 62 coming into engagement with the tooth system 71.

The functioning of the restoring device 36 according to the invention will now be described in greater detail by reference to FIGS. 6 to 9.

FIG. 6 shows a state of the restoring device 36 in which it is not actuated. The coupling device 72 is fully engaged and the first gearwheel 38 (crown gear) and the actuating pin 37 are pressed outwards, i.e. upwards in FIG. 6, by the force of the spring 63 so that the sealing ring 42 is pressed by the conical surface 45 of the actuating pin 37 against the inner end side of the bearing bushing 41 and against the wall of the housing bore 40. The first gearwheel 38 is fully disengaged from the tooth system 71 of the second gearwheel 39. The second gearwheel 39 can thus rotate together with the adjusting nut 29 without the first gearwheel 38 and the actuating pin 37 also being rotated.

FIG. 7 shows a state in which a manual restoration or setting of the actuating device 10 takes place. This restoration or setting is carried out if only the force of the shoe withdrawing springs 12 acts axially on the adjusting pin 30 and the adjusting nut 29. For restoring and setting, the actuating pin 37 is moved inwards together with the first gearwheel 38 against the force of the spring 63 by means of an axial force applied manually from outside until the inner end 67 of the actuating pin 37 reaches the conical surface 66 of the housing 13. In this position, the spring 63 is maximally compressed, wherein it reaches its solid length and acts like a spacer bushing. The coupling device 72 remains fully engaged. Through the inward movement of the first gearwheel 38, the tooth system 62 of the first gearwheel 38 is fully engaged in the tooth system 71 of the second gearwheel 39. Through manual rotation of the actuating pin 37 by means of a suitable tool, torque can now be transmitted in both rotation directions from the actuating pin 37 to the second gearwheel 39 and thus to the adjusting nut 29. The adjusting pin 30 can thus be restored or suitably set. The sealing ring 42 is relieved but does not also move.

Figure 8:
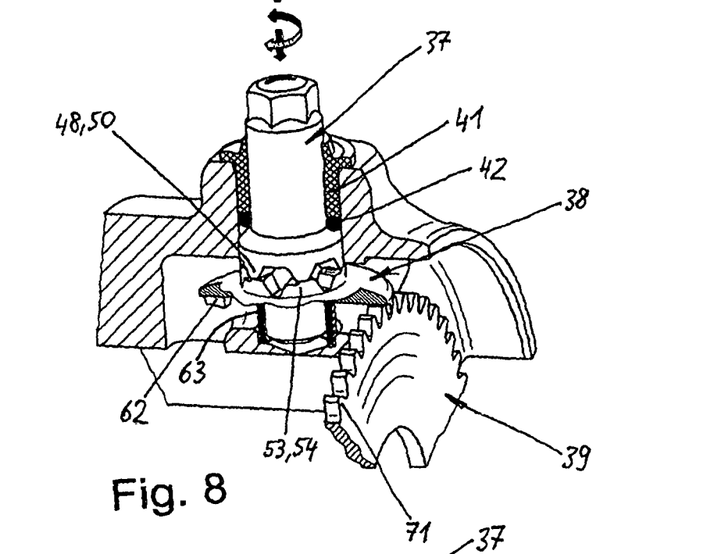

For the setting and restoring of the actuating device 10, a particular torque is necessary and must be transmitted by the coupling device 72. The torque to be transmitted increases suddenly when, for example, an end stop is reached or the brake shoes 2 lie against the brake drum 11. If the counterforce generated in the tooth system of the coupling device 72 is greater than the axial force applied from outside, sliding of the tooth flanks of the drive gear tooth system 48 relative to that of the driven gear tooth system 53 and jumping-over of this tooth system take place. This state is shown in FIG. 8. Since the spring 63 has reached its solid length, the first gearwheel 38 cannot move further inwards, so that the actuating pin 37 is pressed outwards. The tooth system 62 of the first gearwheel 38 remains engaged in the tooth system 71 of the second gearwheel 39 and the sealing ring 42 remains relieved.

Figure 9:
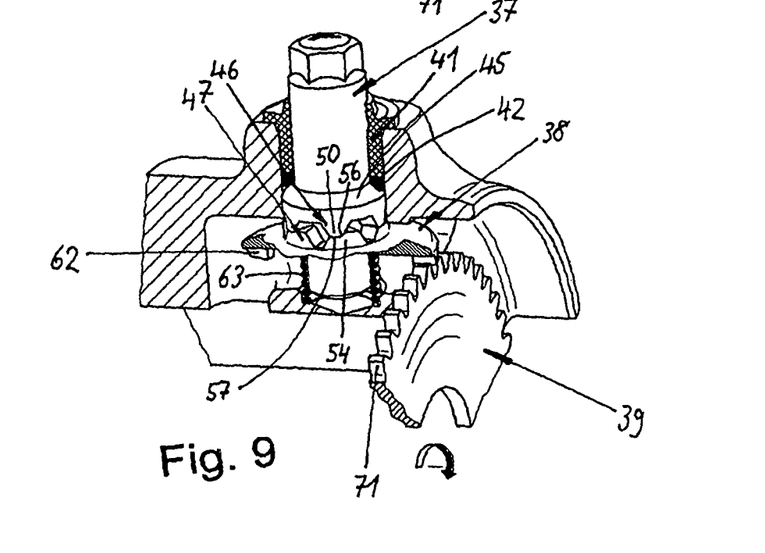

FIG. 9 shows a state which is adopted for testing the functionality of the automatic adjusting device. For testing the automatic adjusting function, the actuating device 10 is restored as described by preferably half a rotation of the actuating pin 37 in a particular rotation direction, for example clockwise, as described by reference to FIG. 7. If the axial force applied from outside is maintained on the actuating pin 37, the tooth system 62 of the first gearwheel 38 remains fully engaged in that of the second gearwheel 39. Subsequently, the actuating pin 37 is rotated so far in the opposite direction, for example anticlockwise until the opposing tooth flanks of the tooth system 62, 71 of the first gearwheel 38 and the second gearwheel 39 touch and a torque begins to build up. The axial force applied to the actuating pin 37 is now reduced far enough that a sliding of the tooth flanks of the coupling device 72 begins, until the second, axially further outwardly situated coupling position is reached in which the tips of the teeth 50 lie against the flat portions 56 of the teeth 54, as shown in FIG. 9. Due to the second inclined portions 56 of the teeth 54, a torque can be transferred on further anticlockwise rotation. If the axial force applied to the axial pin 37 is released, the coupling device 72 remains in this second coupling position since the spring 63 presses the first gearwheel 38 and thus the second coupling part 47 against the first coupling part 46 and, as a result, the conical surface 45 is pressed against the sealing ring 42. The tooth system 62 of the first gearwheel 38 is now only partially engaged in that of the second gearwheel 39.

Testing of the automatic adjusting function now takes place in that the internal expanding brake is actuated so that the expansion piston 17 and its components mounted in the inside move outwards. By this means, the second gearwheel 39 is also moved in its axial direction, i.e. perpendicularly to the central axis of the first gearwheel 38, so far that the tooth system 71 of the second gearwheel 39 comes fully out of engagement with the tooth system 62 of the first gearwheel 38. Following ending of the braking actuation of the internal expanding brake, the outwardly moved parts return to their starting position. During this reverse movement, with the automatic adjusting function intact, the adjusting nut 29 and therewith the second gearwheel 39 is rotated by means of elements of the adjusting device (not shown) so that if the tooth systems 62, 71 of the first and second gearwheel 38, 39 are in engagement again, a corresponding rotation of the first gearwheel 38 results. In this case, the second coupling position is disengaged and the first gearwheel 38 rotates back into the first coupling position. Thus, the starting condition of the adjusting device is achieved again. With a proper automatic adjusting function, the actuating pin 37 can thus subsequently be pressed inwards again along its entire axial travel, as shown in FIG. 7.

However, if the automatic adjusting function does not operate properly, i.e. if the adjusting nut 29 and thus the second gearwheel 39 are not rotated, the first gearwheel 38 remains in the second coupling position shown in FIG. 9 following ending of the braking procedure. The actuating pin 37 can no longer be pressed inwards over its whole predetermined axial travel, since the tooth system 62 of the first gearwheel 38 already lies against the tooth system 71 of the second gearwheel 39 after a short engaging travel.

The invention claimed is:

1. Actuating device for an internal expanding brake comprising
   a housing,
   at least one expansion piston displaceably mounted in the housing, in which an adjusting pin is displaceably arranged, on which a brake shoe is supported,
   an adjusting device for automatic adjustment of the adjusting pin depending upon the clearance between the brake shoe and a brake drum of the internal expanding brake, wherein the adjusting device comprises an adjusting nut which is rotatably mounted in or on the expansion piston and cooperates with a thread of the adjusting pin, in order by rotation of the adjusting nut to displace the adjusting pin relative to the expansion piston, a restoring device for manual setting and restoration of the adjusting pin relative to the expansion piston, the restoring device having an actuating pin which is rotatably mounted in the housing and is configured for transmitting a torque applied manually to the actuating pin, and a restoring gear mechanism which has a first gearwheel coupled to the actuating pin and a second gearwheel coupled to the adjusting nut, in order to transmit the rotary movement of the actuating pin to the adjusting nut, wherein the first gearwheel of the restoring gear mechanism is coupled to the actuating pin, is displaceable in the axial direction of the actuating pin and is bringable by means of a coupling device, depending upon the torque transmitted, into and out of non-rotational engagement with the actuating pin, and wherein the coupling device comprises a first coupling part fixedly arranged on the actuating pin as well as a second coupling part fixedly arranged on the first gearwheel, which is bringable into and out of driving engagement with the first coupling part.

2. Actuating device according to claim 1, wherein the second gearwheel consists of a spur gear and the first gearwheel consists of a crown gear which is bringable into and out of mesh with the second gearwheel.

3. Actuating device according to claim 1, wherein the first gearwheel is mounted axially displaceably on the actuating pin, wherein the actuating pin penetrates the first gearwheel centrally.

4. Actuating device according to claim 1, wherein the first coupling part protrudes radially from the actuating pin.

5. Actuating device according to claim 4, wherein the first coupling part comprises a drive gear tooth system fixedly arranged on the actuating pin and the second coupling part comprises a driven gear tooth system which is fixedly arranged on the first gearwheel and is bringable into and out of driving engagement with the drive gear tooth system.

6. Actuating device according to claim 4, wherein the drive gear tooth system and the driven gear tooth system each consist of a spur gear tooth system.

7. Actuating device according to claim 5, wherein the drive gear and driven gear tooth systems have teeth with wedge-shaped tooth flanks extending in an inclined manner such that the torque transmitted by means of the actuating pin generates an axial force between the first and second coupling part which urges the first and second coupling parts apart axially.

8. Actuating device according to claim 7, wherein the teeth of the actuating pin and/or the teeth of the first gearwheel have a stepped tooth flank which has two inclined portions for transmitting a torque and comprises a flat portion arranged between the inclined portions, which is configured as an axial support portion for the opposing coupling part.

9. Actuating device according to claim 1, wherein the actuating pin is mounted longitudinally displaceably in a bore of the housing and is movable between an outer position and an inserted position, wherein the first gearwheel is out of engagement with the second gearwheel when the actuating pin is in its outer position and the first and second coupling parts maximally engage with one another and wherein the first gearwheel is in engagement with the second gearwheel when the actuating pin is in its inner position.

10. Actuating device according to claim 9, wherein the first gearwheel is pressed against the first coupling part of the actuating pin by a spring surrounding the actuating pin and supported against the housing, by which means the actuating pin is biased into its outer position.

11. Actuating device according to claim 10, wherein the first gearwheel is situated in a housing cavity which is delimited towards the expansion piston at least in part by means of a housing portion surrounding the expansion piston, against which housing portion the spring is supported.

12. Actuating device according to claim 9, wherein the actuating pin is mounted in a bearing bushing fixed in the bore of the housing, said bushing forming an axial stop for delimiting the axial outward movement of the actuating pin.

13. Actuating device according to claim 12, wherein the actuating pin comprises a stop surface formed by a diameter step which cooperates with the bearing bushing to delimit the outward axial movement of the actuating pin, wherein the diameter step is formed by the rear side of the first coupling part.

14. Actuating device according to claim 1, wherein the second gearwheel is rigidly connected to the adjusting nut and protrudes radially over the adjusting nut and the expansion piston.

* * * * *